United States Patent
Thompson et al.

(10) Patent No.: US 10,235,873 B2
(45) Date of Patent: Mar. 19, 2019

(54) SYSTEM AND METHOD TO FACILITATE CONFIGURATION OF A CONTROLLING DEVICE

(75) Inventors: Brandt J. Thompson, Newport Coast, CA (US); Jon Gallegos, Corona, CA (US); Jason L. Godwin, Enschede (NL); Patrick H. Hayes, Mission Viejo, CA (US)

(73) Assignee: Universal Electronics Inc., Santa Ana, CA (US)

( * ) Notice: Subject to any disclaimer, the term of this patent is extended or adjusted under 35 U.S.C. 154(b) by 1299 days.

(21) Appl. No.: 12/490,978

(22) Filed: Jun. 24, 2009

(65) Prior Publication Data

US 2009/0292375 A1 Nov. 26, 2009

Related U.S. Application Data

(60) Continuation-in-part of application No. 12/421,065, filed on Apr. 9, 2009, now Pat. No. 8,015,446, which is a division of application No. 11/340,442, filed on Jan. 26, 2006, now Pat. No. 7,895,532, which is a division of application No. 10/288,727, filed on Nov. 6, 2002, now Pat. No. 7,831,930.

(Continued)

(51) Int. Cl.
| | |
|---|---|
| *G06F 3/048* | (2013.01) |
| *G08C 19/28* | (2006.01) |
| *G08C 17/00* | (2006.01) |
| *G08C 23/04* | (2006.01) |
| *H04N 21/422* | (2011.01) |

(52) U.S. Cl.
CPC ............. *G08C 19/28* (2013.01); *G08C 17/00* (2013.01); *G08C 23/04* (2013.01); *H04N 21/42221* (2013.01); *G08C 2201/20* (2013.01); *G08C 2201/30* (2013.01); *G08C 2201/91* (2013.01); *G08C 2201/92* (2013.01)

(58) Field of Classification Search
CPC ................................. G08C 19/28; G08C 23/04
See application file for complete search history.

(56) References Cited

U.S. PATENT DOCUMENTS

| | | | |
|---|---|---|---|
| 4,623,887 A | 11/1986 | Welles, II | |
| 4,959,810 A | 9/1990 | Darbee et al. | |

(Continued)

FOREIGN PATENT DOCUMENTS

| | | |
|---|---|---|
| EP | 1936580 A2 | 6/2008 |
| EP | 1936581 A2 | 6/2008 |

(Continued)

OTHER PUBLICATIONS

Office Action issued for U.S. Appl. No. 09/615,473 dated Sep. 25, 2006.

(Continued)

*Primary Examiner* — Claudia Dragoescu
(74) *Attorney, Agent, or Firm* — Greenberg Traurig, LLP

(57) ABSTRACT

A system and method wherein geographic data is used to configure a controlling device to control operations of a target device and/or to configure the controlling device to control tuning operations of a target device. The system additionally provides for the harmonization of controlling device configurations made on the controlling device and/or a remote computer.

7 Claims, 10 Drawing Sheets

Related U.S. Application Data

(60) Provisional application No. 61/076,226, filed on Jun. 27, 2008, provisional application No. 60/344,020, filed on Dec. 20, 2001, provisional application No. 60/344,774, filed on Jan. 3, 2002.

(56) References Cited

U.S. PATENT DOCUMENTS

| | | | |
|---|---|---|---|
| 5,614,906 | A | 3/1997 | Nguyen et al. |
| 6,104,334 | A * | 8/2000 | Allport .................. 341/175 |
| 6,225,938 | B1 | 5/2001 | Escobosa et al. |
| 6,563,430 | B1 * | 5/2003 | Kemink et al. ............ 340/8.1 |
| 6,640,144 | B1 | 10/2003 | Cao et al. |
| 6,785,579 | B2 | 8/2004 | Cao et al. |
| 6,829,512 | B2 | 12/2004 | Cao et al. |
| 6,859,197 | B2 | 2/2005 | Presseau et al. |
| 7,093,003 | B2 | 8/2006 | Conway, Jr. et al. |
| 7,143,214 | B2 | 11/2006 | Do et al. |
| RE39,716 | E | 7/2007 | Cao et al. |
| 7,254,777 | B2 | 8/2007 | Arling et al. |
| 2001/0033243 | A1 * | 10/2001 | Harris et al. ............. 341/176 |
| 2002/0057283 | A1 | 5/2002 | Biswas et al. ............ 345/700 |
| 2002/0143918 | A1 * | 10/2002 | Soles et al. .............. 709/223 |
| 2002/0144289 | A1 * | 10/2002 | Taguchi et al. ............ 725/112 |
| 2002/0198900 | A1 * | 12/2002 | Kruglikov et al. .......... 707/200 |
| 2003/0056216 | A1 * | 3/2003 | Wugofski ........... H04N 5/44543 725/46 |
| 2003/0103088 | A1 * | 6/2003 | Dresti et al. ............. 345/835 |
| 2005/0216606 | A1 | 9/2005 | Hayes et al. |
| 2008/0046916 | A1 * | 2/2008 | Shivaji-Rao ....... H04N 7/17318 725/25 |
| 2009/0244402 | A1 * | 10/2009 | Rye ...................... G08C 17/00 348/734 |

FOREIGN PATENT DOCUMENTS

| | | |
|---|---|---|
| WO | 00/17737 A1 | 3/2000 |
| WO | 03/044756 A1 | 5/2003 |

OTHER PUBLICATIONS

WIPO, International Preliminary Report on Patentability of PCT Appln. No. US09/48620, dated Jan. 5, 2011, 6 pages.

The State Intellectual Property Office of the People's Republic of China, Office Action issued on Chinese Patent Appln. No. 200980124715.5, 8 pages.

European Patent Office, Supplementary European Search Report of EP patent application No. 09771008.1, 13 pages.

European Patent Office, Examination Report issued on EP patent application No. 09771008.1, 5 pages.

U.S. Patent Office, Office Action issued on U.S. Appl. No. 15/053,323, dated Jun. 28, 2018, 9 pgs.

\* cited by examiner

SYSTEM AND METHOD TO FACILITATE CONFIGURATION OF A CONTROLLING DEVICE

RELATED APPLICATION INFORMATION

This application claims the benefit of U.S. Provisional Application No. 61/076,226, filed Jun. 27, 2008.

This application additionally claims the benefit of, and is a continuation-in-part of, U.S. application Ser. No. 12/421,065, filed Apr. 9, 2009, which is a divisional of U.S. application Ser. No. 11/340,442, filed Jan. 26, 2006, which is a divisional of U.S. application Ser. No. 10/288,727, filed Nov. 6, 2002, which application claimed the benefit of U.S. Provisional Application Nos. 60/344,020, filed Dec. 20, 2001, and 60/344,774, filed Nov. 20, 2001.

The disclosure within each of these applications is incorporated herein by reference in its entirety.

BACKGROUND

This invention relates generally to controlling devices, such as for example universal remote controls, and more specifically to systems and methods for configuration of such devices, for example matching controlling device commands to the appliances to be controlled, defining favorite channels, etc.

As is known in the art, in order to associate a universal controlling device with an appliance to be controlled, data may be provided to the controlling device that serves to identify an intended target appliance by its type and make (and sometimes model). Such data may allow the controlling device to identify appropriate command data within a library of command data that is pre-stored in or downloaded into the controlling device, and to transmit recognizable commands in a format appropriate for such identified appliances. Multiple methods for providing such setup data have been proposed, including the known setup procedures described, for example, in U.S. Pat. Nos. 4,959,810, 5,614,906, and 6,225,938, which describe self-contained setup of controlling devices, and U.S. patent application Ser. Nos. 09/804,623 and 09/615,473 which describe setup of controlling devices by interaction with a Web site. It will also be appreciated that a controlling device may be set up to command operations of an appliance by being taught the command codes needed to command such appliance as described in U.S. Pat. No. 4,623,887. Still further, it will be understood that a controlling device may be upgradeable with additional or revised command data, for example, by transfer via an external input port as described in the aforementioned U.S. Pat. No. 4,959,810.

While these variously known systems and methods for configuring a universal controlling device generally work for their intended purpose, a need remains for a system and method that provides a yet more convenient and user friendly way for configuring a universal controlling device.

SUMMARY OF THE INVENTION

In accordance with this and other needs, the following generally describes a system and method for rapid configuration of a universal controlling device. To this end, in addition to one or more of the previously described configuration methods, a universal controlling device may be provisioned with a method by means of which a user, upon entry of information indicative of geographical location or other regional identity, is presented with a selected set of appliance codes to be tested, such selection based upon known brand and/or model popularity for that region. Since in general, for a given market or region a relatively small number of brands and command code sets represent a large segment of the installed base of appliances (the so-called "top 25" rule, or other such number as appropriate for a particular situation), the approach described above allows a universal controlling device provisioned with a single command code library to be rapidly configurable "out of the box" across a broad geographic spectrum. Further, as a means to provide complete appliance control coverage, such a controlling device library may be supplemented by additional downloadable command codes sets corresponding to less common appliances using optional PC and/or Internet based configuration methods.

Additionally, methods are presented by means of which the configuration of other controlling device options, such as for example the programming of favorite channel selection buttons or icons of the controlling device, may be simplified and/or expedited by the use of such regional data.

A better understanding of the objects, advantages, features, properties and relationships of the invention will be obtained from the following detailed description and accompanying drawings which set forth illustrative embodiments and which are indicative of the various ways in which the principles of the invention may be employed.

BRIEF DESCRIPTION OF THE DRAWINGS

For a better understanding of the various aspects of the invention, reference may be had to preferred embodiments shown in the attached drawings in which.

DETAILED DESCRIPTION

Figure 1:
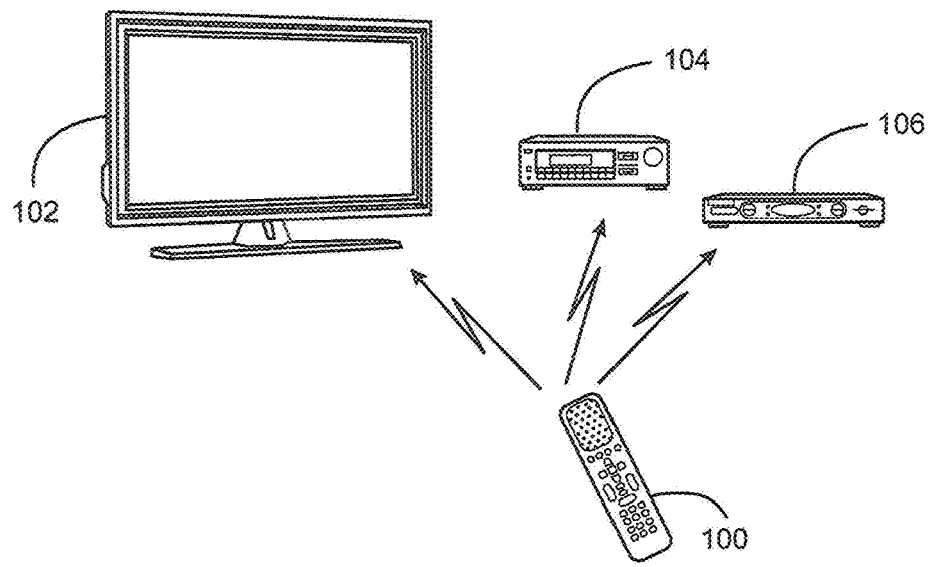
FIG. 1 illustrates a system in which an exemplary controlling device is configured to issue operational commands to exemplary controlled appliances according to the principles of the instant invention.

The following describes a system and method by means of which a universal controlling device, such as a remote control, may be configured to command the operation of various consumer electronic appliances. By way of example, FIG. 1 illustrates an exemplary system wherein a controlling device 100 may be used to command functions of various appliances such as a television 102, an AV receiver 104, a cable or satellite set top box 106, etc. In the embodiment illustrated, controlling device 100 communicates with controlled devices 102, 104, 106 via a unidirectional infrared (IR) link, however, as is known in the art, controlling device 100 may be capable of communicating with these appliances using any convenient IR, RF, point-to-point, or networked protocol to cause the appliances to perform operational functions, provided the control protocols and command values to be used in communicating with a desired appliance are known to the operational software of controlling device 100.

Figure 2:
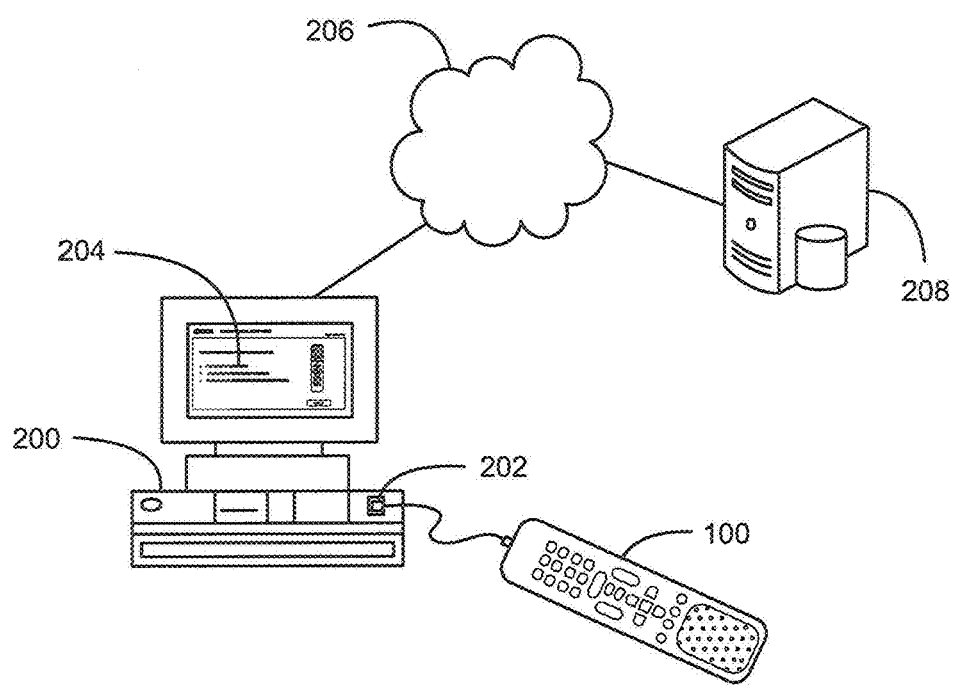
FIG. 2 illustrates a system wherein the exemplary controlling device of FIG. 1 is placed into communication with a personal computer for the purpose of perfecting the configuration of the controlling device.

As illustrated in FIG. 2, controlling device 100 may also be periodically placed into communication with a personal computer ("PC") 200, for example via a USB port 202 or other suitable connecting means, in order to initiate or perfect the configuration of controlling device 100. To this end, a configuration application may be executed by PC 200 to upload configuration data from controlling device 100, to provide a user interface 204 for display and selection of configuration options, and to download resulting new and/or modified configuration data to controlling device 100. The creation of such new or modified configuration data may include the use of data stored locally on PC 200 and/or data stored on a server 208 and accessed via a wide area communication network 206 such as the Internet. As is known in the art, the configuration application executed on PC 200 may without limitation take the form of a local application, a Java applet, HTML statements, ActiveX controls, etc., or any combination thereof as appropriate. Further all or parts of the various steps performed in the processes involved in generating a controlling device configuration may be performed locally on PC 200 or at a Web service hosted by server 208, without limitation.

While illustrated in the context of a television 102, an A/V receiver 104 and a set top box 106, it is to be understood that controllable appliances may include, but are not limited to, televisions, VCRs, DVRs, DVD players, cable or satellite converter set-top boxes ("STBs"), amplifiers, CD players, game consoles, home lighting, drapery, fans, HVAC systems, thermostats, personal computers, etc. It will also be appreciated that, while in the illustrative embodiment a PC 200 is utilized to assist in the configuration of controlling device 100, in alternative embodiments this function may be performed equally well by any other appliance such as, for example, a set top box. Further, while the illustrative coupling of controlling device 100 to the configuring appliance is via a wired interface 202, it will be appreciated that in alternative embodiments other coupling means may be employed with equal success, for example wireless connections such as WiFi, Bluetooth, infrared transmission, etc.

Figure 3:
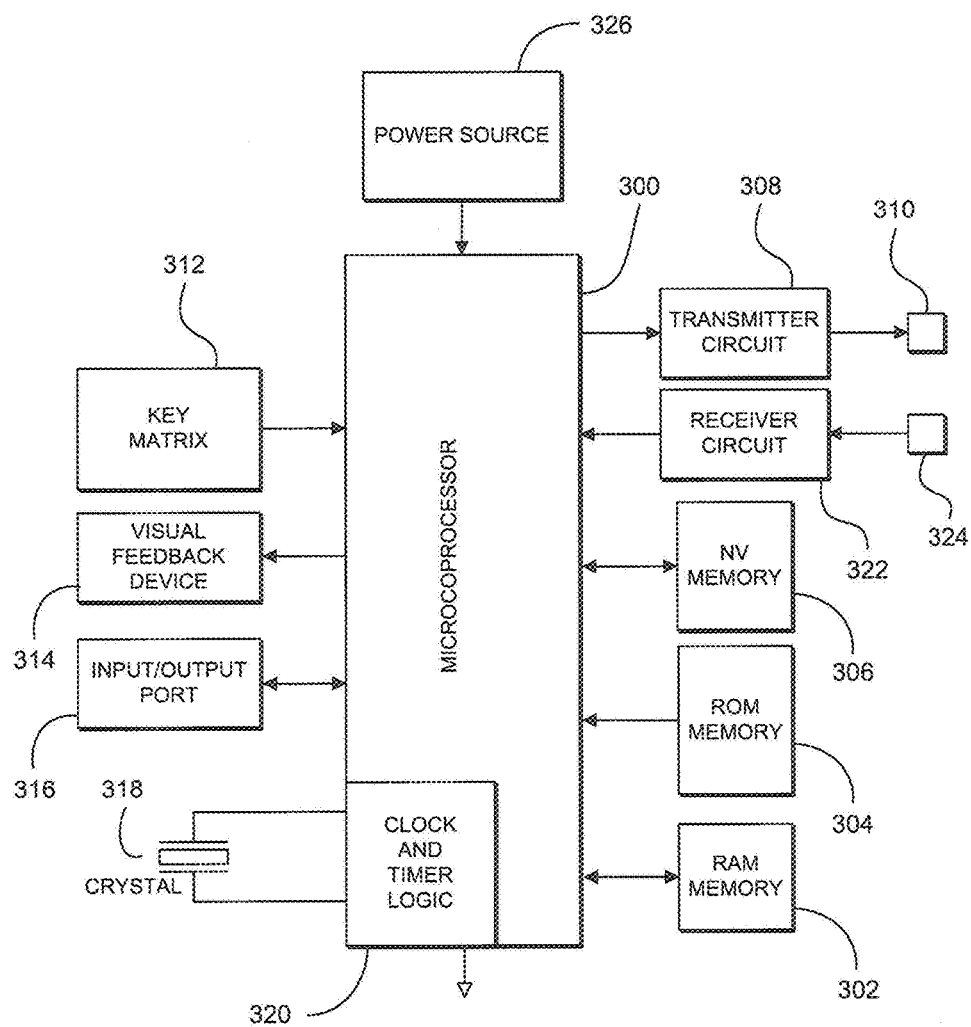
FIG. 3 illustrates a block diagram of exemplary components of the exemplary controlling device of FIG. 1.

With reference to FIG. 3, for use in commanding the functional operations of one or more appliances, a controlling device 100 may include, as needed for a particular application, a processor 300 coupled to a ROM memory 304, a RAM memory 302, a key matrix 312 (e.g., hard keys, soft keys such as a touch sensitive surface overlaid on a liquid crystal (LCD) or an electroluminescent (EL) display, or some combination thereof), a transmission circuit 308 and associated IR and/or RF emitter 310, a non-volatile read/write memory 306, a means 314 to provide feedback to the user (e.g., one or more visible LEDs, LCD display, speaker, backlighting, and/or the like), a power source 326, an input/output port 316 such as a serial interface, modem, USB port, etc., and clock and timer logic 320 with associated crystal or resonator 318.

As will be understood by those skilled in the art, some or all of the memories 302, 304, 306 may include executable instructions (collectively, the program memory) that are intended to be executed by the processor 300 to control the operation of the remote control 100, as well as data that serves to define the aforementioned control protocols and command values to the operational software (collectively, the command data). In this manner, the processor 300 may be programmed to control the various electronic components within the remote control 100, e.g., to monitor the power supply 310, to cause the transmission and reception of signals, control visual feedback device(s) 314, etc. All or part of the non-volatile read/write memory 306, for example an EEPROM, battery-backed up RAM, FLASH, Smart Card, memory stick, or the like, may additionally be used to store setup data and parameters as necessary. While the memory 304 is illustrated and described as a ROM memory, memory 304 may also be comprised of any type of readable media, such as ROM, FLASH, EEPROM, or the like. Preferably, the memories 304 and 306 are non-volatile or battery-backed such that data is not required to be reloaded after battery changes. In addition, the memories 302, 304 and 306 may take the form of a chip, a hard disk, a magnetic disk, an optical disk, and/or the like. Still further, it will be appreciated that some or all of the illustrated memory devices may be physically incorporated within the same IC chip as the microprocessor 300 (a so called "microcontroller") and, as such, they are shown separately in FIG. 3 only for the sake of clarity.

To cause the controlling device 100 to perform an action, controlling device 100 is adapted to be responsive to events, such as a sensed user interaction with the key matrix 312, etc. In response to an event, appropriate instructions within the program memory (hereafter the "operating program") may be executed. For example, when a function key is actuated on the controlling device 100, the controlling device 100 may retrieve from the command data stored in memory 302, 304, and/or 306 the command value and control protocol currently assigned to the actuated function key and the currently assigned device mode to thereby transmit a command to an intended target appliance, e.g., the STB 106 or the TV 102, in a format recognizable by the intended target appliance. It will also be appreciated that the operating program can be used not only to cause the transmission of command codes and/or data to the appliances, but also to perform local operations. While not limiting, local operations that may be performed by the controlling device 100 may include displaying information/data, favorite channel setup, macro key setup, function key relocation, etc. Examples of local operations can be found in U.S. Pat. Nos. 5,481,256, 5,959,751, and 6,014,092. An additional local operation is the ability to "lock" function keys across device operational modes as described in U.S. Published Patent Application No. 2003/0025840.

Figure 4:
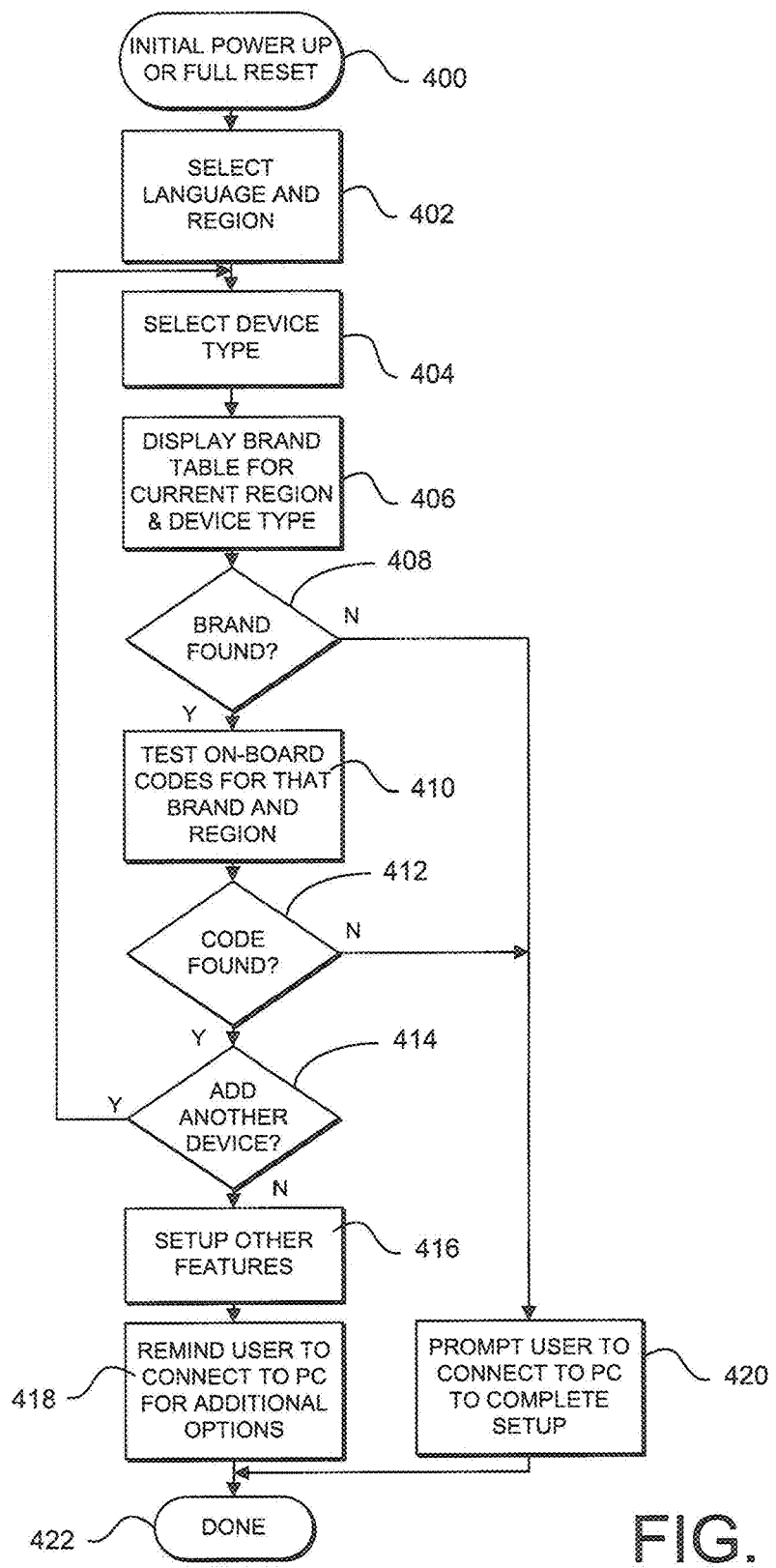
FIG. 4 illustrates in flow chart form an exemplary method for on-device setup of the exemplary controlling device of FIG. 1.

Turning now to FIG. 4, an exemplary method for configuring universal controlling device 100 is described. Commencing at step 400 upon initial power up or after user reset of the device, at step 402 a user selects a language (for example English/Spanish/French) and a geographical region (for example North America/Europe/Latin America). The geographical region may also be automatically determined by the controlling device using any GPS or the like hardware stored thereon. Next, at step 404 the user selects a target device type (for example TV/Cable Box/AV Receiver). Based upon this information, at step 406 the operating program of controlling device 100 retrieves from its memory a list of the most common brands for the specified (or otherwise identified) geographical region and device type (for example, TVs in Latin America). In certain embodiments, this list may be further regionalized according to the selected language (for example Europe/English versus Europe/French). An appropriate list of brand names is then displayed to permit user selection of an individual one of the identified common brands. If the user's appliance brand is not listed, at step 408 this setup process is ended and the user is advised at step 420 to connect controlling device 100 to a PC and complete the configuration process using a PC application as described in further detail hereafter.

Once the user has selected a brand from the displayed brand listing, the operating software of controlling device 100 may identify those command code sets within the library of command code sets stored in its memory that are applicable to the selected brand, geographical region, and device type (for example Samsung/North America/TV). The operating software may then issue a series of prompts which guide the user through a process whereby the identified command code sets are tested one by one (either manually or automatically) against the target appliance, for example by the controlling device using each command code set to transmit a response-evoking command such as "mute" or "power," until the correct command code set is identified, i.e., the target device responds to a transmitted command. If during this process no compatible code set is identified as being appropriate for commanding the target device, the setup process is ended and as described previously the user is advised to complete the configuration process by connecting controlling device 100 to a PC as described hereafter.

If a compatible command code set is found during the testing process, then at step 414 the user is presented with the opportunity to repeat the above process for another device. In this manner, a user may configure controlling device 100 to communicate with all their items of equipment 102, 104, 106, etc. Once all desired target equipment has been configured on the controlling device 100, at step 416 the user is given the opportunity to configure other locally supported features of controlling device 100, for example designating that all volume control commands be issued to a single device such as AV receiver 104, programming quick access keys for favorite channels, etc. Finally, at step 422 the user is reminded that additional configuration options may be available by connecting controlling device 100 to a PC.

It will be appreciated that regional information may also be used to provide the controlling device 100 with regionally relevant language and/or key layout settings, e.g., key layout displays and/or key command assignments, during the controlling device 100 configuration process as described, for example, in U.S. application Ser. No. 12/421,065 at page 77, line 17-page 79, line 2.

Figure 5:
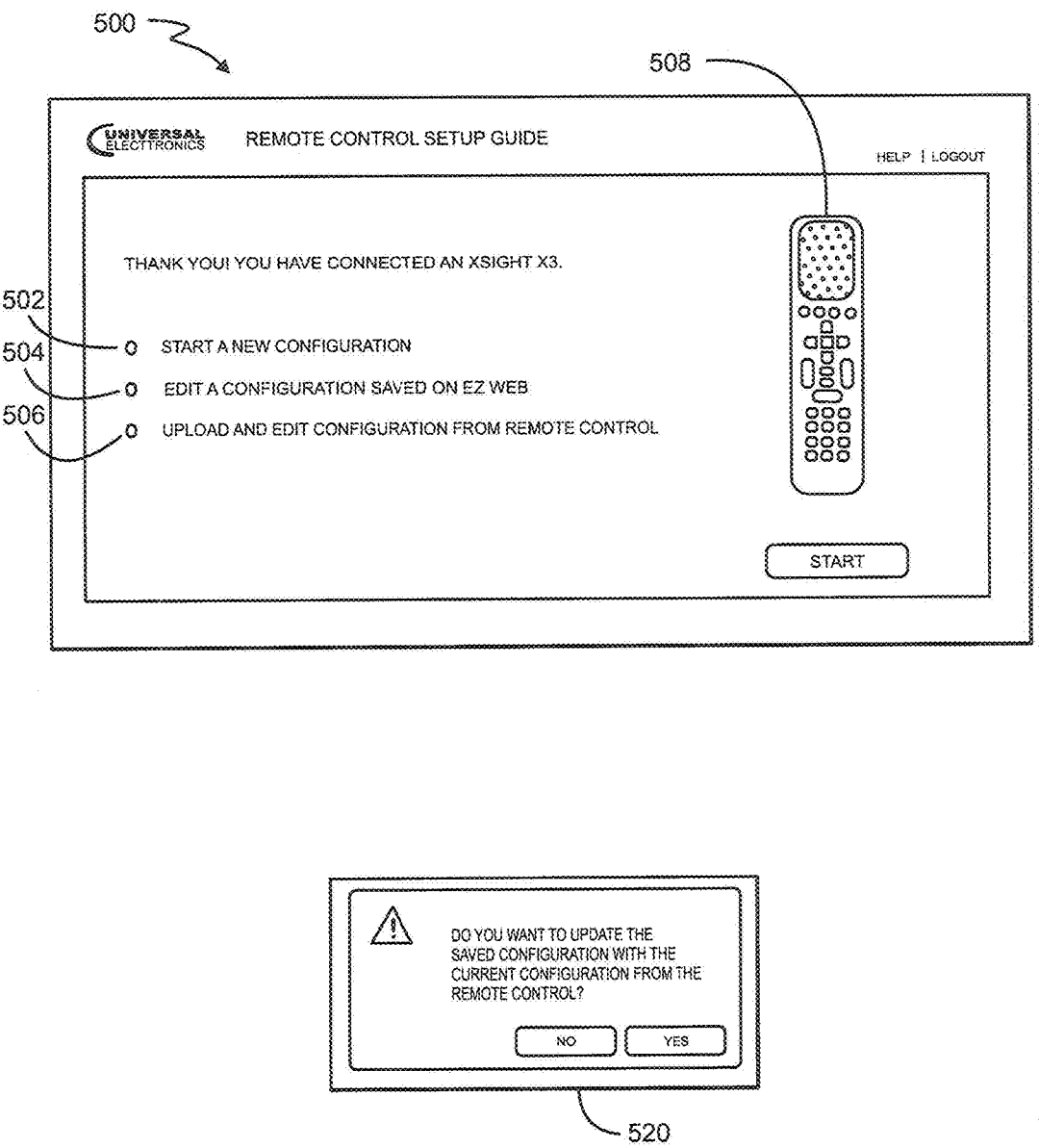
FIG. 5 illustrates portions of an exemplary user interface which may be invoked upon the controlling device of FIG. 1 being placed into communication with a personal computer as illustrated in FIG. 2.
Figure 6:
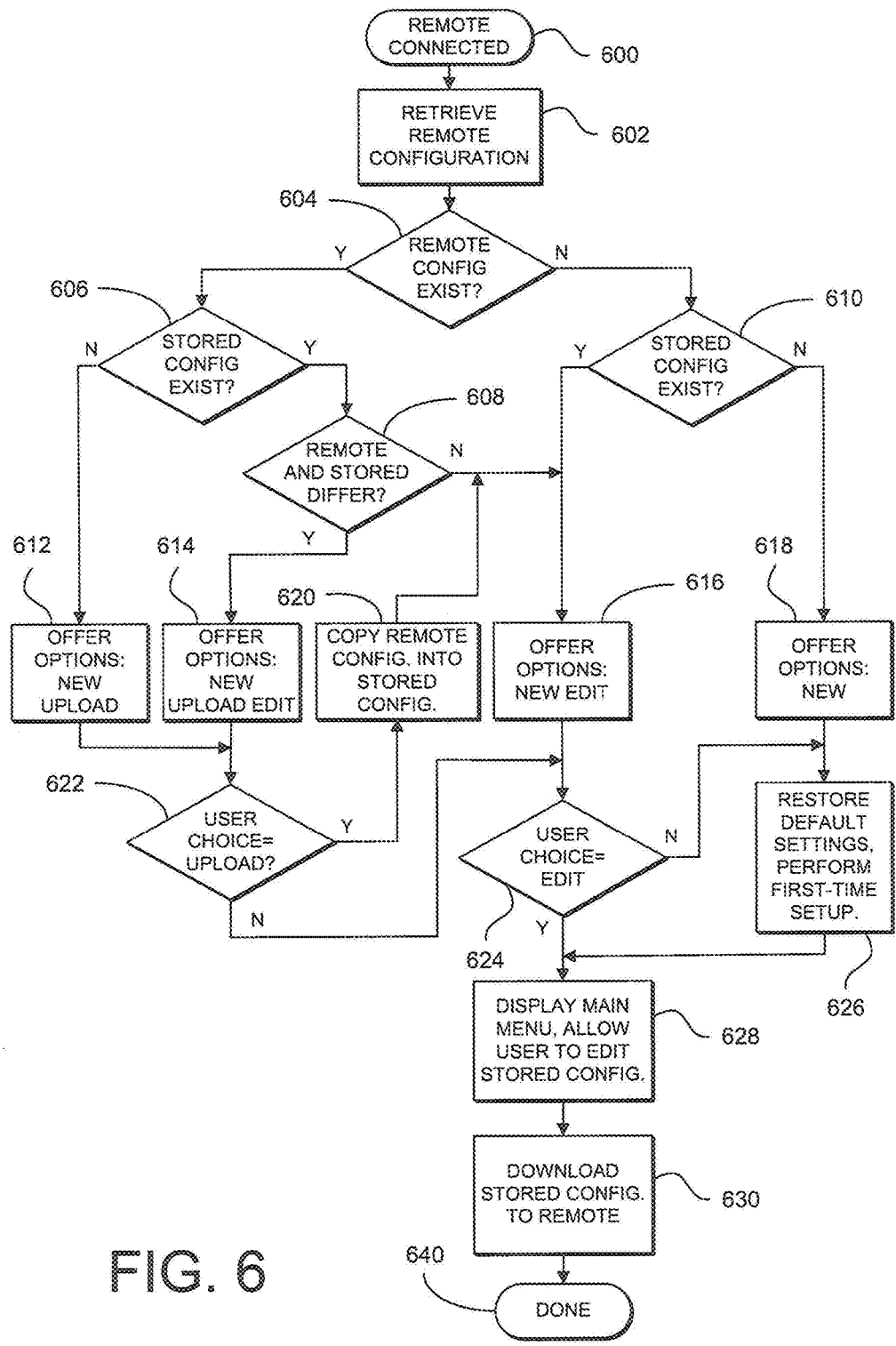
FIG. 6 illustrates in flow chart form an exemplary method for harmonizing stored configuration settings between the controlling device of FIG. 1 and the exemplary personal computer of FIG. 2.

With reference to FIG. 2, upon detection by PC 200 that a controlling device 100 has been connected therewith, a configuration application 204 may be automatically invoked as is well known in USB art. Configuration application 204 may commence with a screen display 500 as illustrated in FIG. 5 which includes an image 508 of the controlling device just connected—by way of confirmation to a user that the type and model of their controlling device has been correctly identified by configuration application 204—together with a selection of possible actions to be performed 502, 504, 506. As will be described in further detail in conjunction with the flowchart of FIG. 6, the list of possible actions presented to the user may vary depending upon the respective status of the controlling device's current configuration and that of configuration(s) previously stored by configuration application 204. In this regard, it will be appreciated that in various embodiments such stored configurations may be located locally on PC 200, remotely on server 208, or a combination thereof, as appropriate. It will also be appreciated that in certain embodiments the ability to select one of multiple stored configurations may be offered. With reference to FIG. 6, when a controlling device is connected at step 600, its current configuration data is retrieved at step 602. Next, in an exemplary embodiment, steps 604, 606, 608 and 610 perform a harmonization algorithm to determine which possible actions are to be offered to the user, as follows:

Controlling device configured, no stored configuration: Create a new configuration, or use the existing configuration from the controlling device (step 612).

Controlling device configured, stored configuration present which is different from that of the controlling device: Possible actions: Create a new configuration, use the existing configuration from the controlling device, or use the existing stored configuration (step 614).

Controlling device configured, stored configuration present which is the same as that of the controlling device: Possible actions: Create a new configuration, or use the existing stored configuration (step 616).

Controlling device not configured, stored configuration present: Possible actions: Create a new configuration, or use the existing stored configuration (step 616).

Controlling device not configured, no stored configuration: Possible actions: Create a new configuration (step 618).

If a user selects the "upload" option in either of steps 612 or 614, at step 620 the configuration data retrieved from the controlling device is used to update the stored configuration data. As illustrated by warning message 520, in cases where this action will result in the overwriting of previously-saved configuration data, a user confirmation may be requested before the action is performed.

If a user selects the "new" option in either of steps 614, 616, or 618, at step 626 the configuration settings are initialized to default values and a first time setup is initiated. By way of example, without limitation, such a first time setup may comprise entry of a name for the configuration, user profile data, equipment types, region and language information, etc. Thereafter, at step 628 a user may be presented with a main menu of configuration editing options, in the same manner as a user who had selected the "edit" option at steps 614 or 616.

Figure 7:
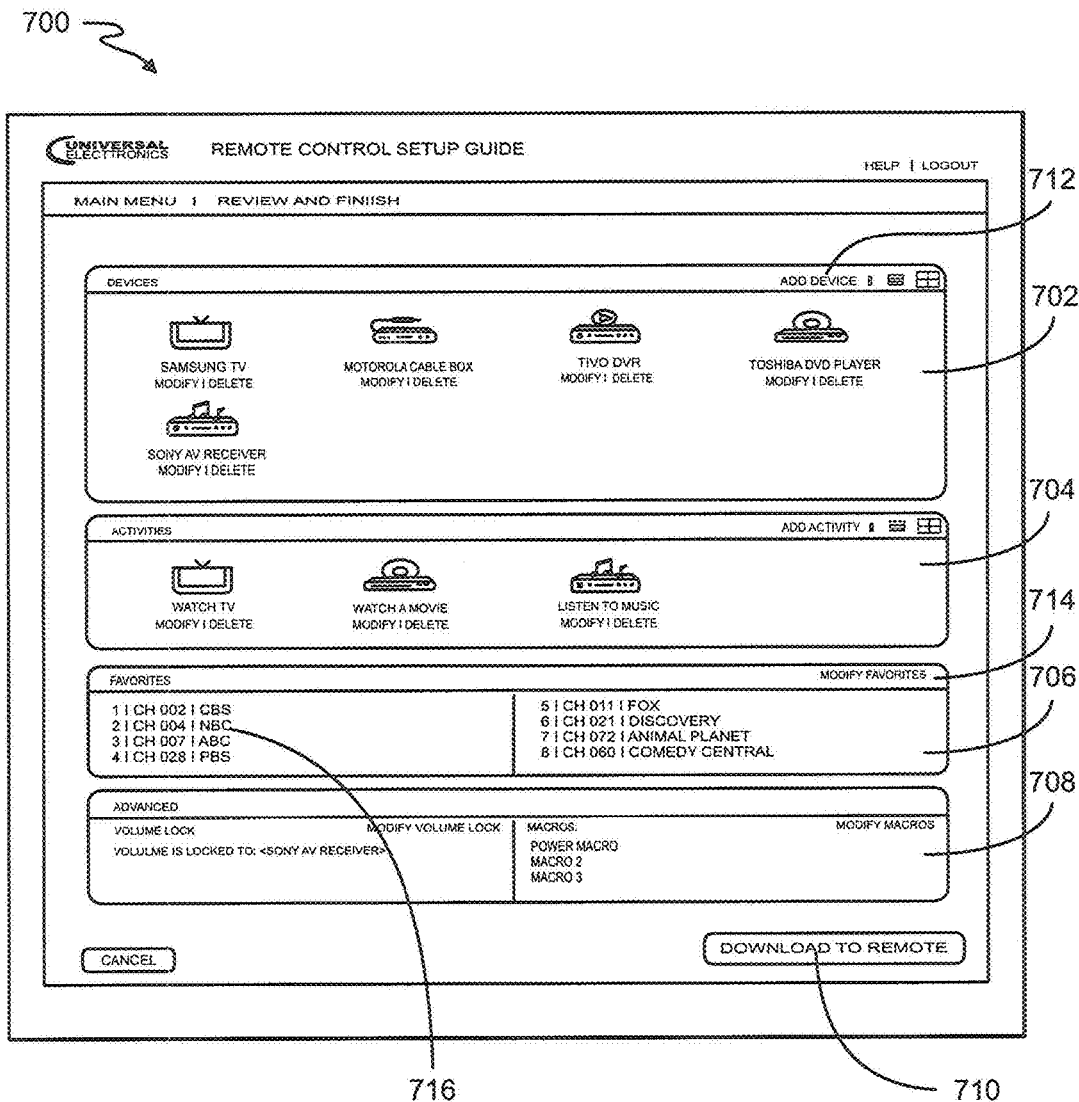
FIG. 7 illustrates an exemplary user interface comprising a menu of user-selectable options for editing the configuration of the exemplary controlling device of FIG. 1.

With reference to FIG. 7, an exemplary main menu of configuration editing options 700 may include options 702 to allow a user to add, modify, or delete devices; 704 to allow a user to add, modify, or delete activities; 706 to allow a user to add, modify, or delete favorites keys of the controlling device; or 708 to allow a user to configure special options such as volume lock or macro sequences. In the illustrative embodiment, upon completion of all desired editing activity, user selection of icon 710 "Download to Remote" may result in the loading of the updated configuration data into connected controlling device 100, step 630 of the flowchart of FIG. 6, after which at step 640 controlling device 100 may be disconnected from PC 200 and all actions completed.

Figure 8:
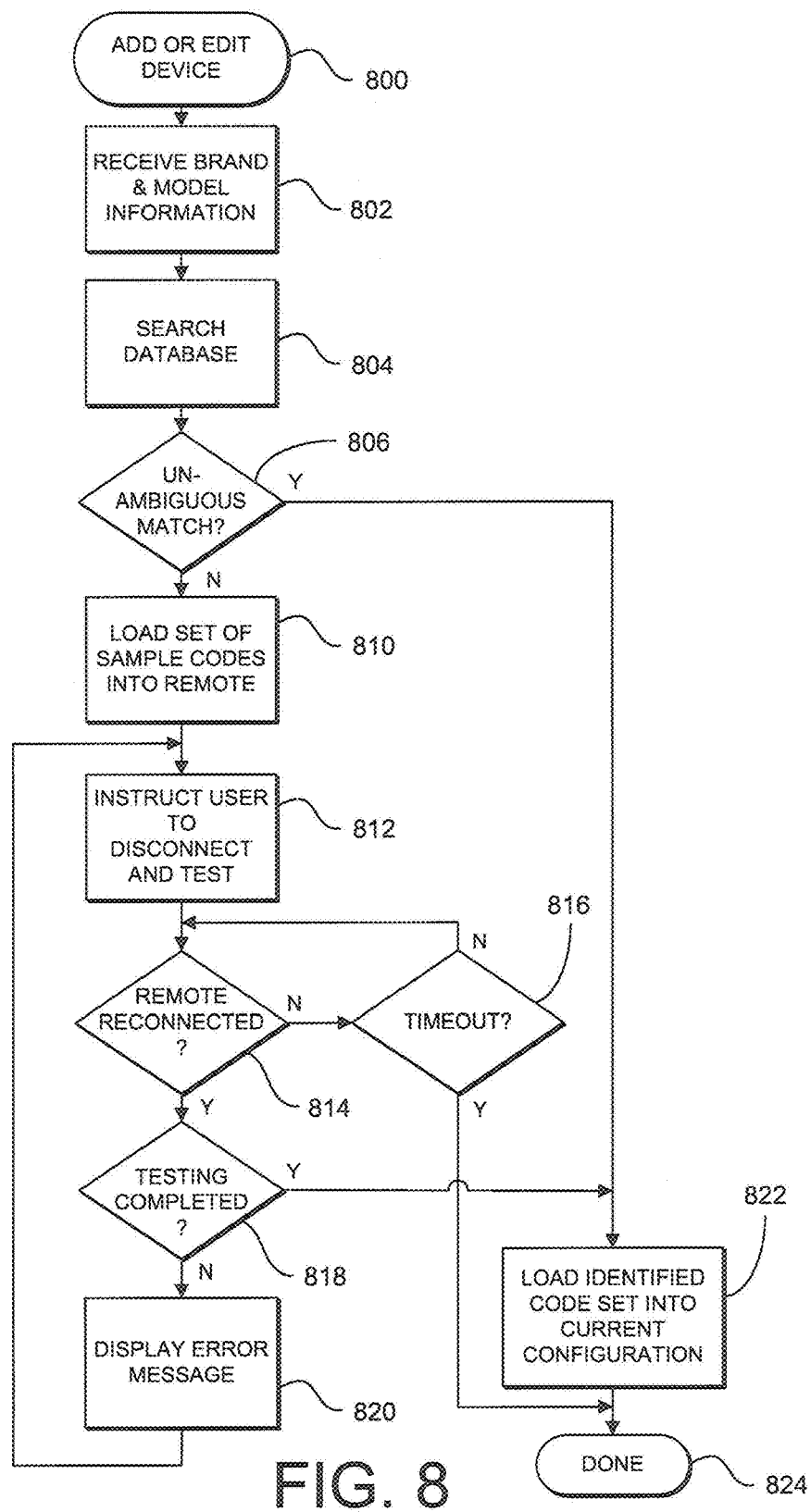
FIG. 8 illustrates in flow chart form an exemplary method for identifying a appropriate command set for an appliance to be controlled by the exemplary controlling device of FIG. 1.
Figure 9:
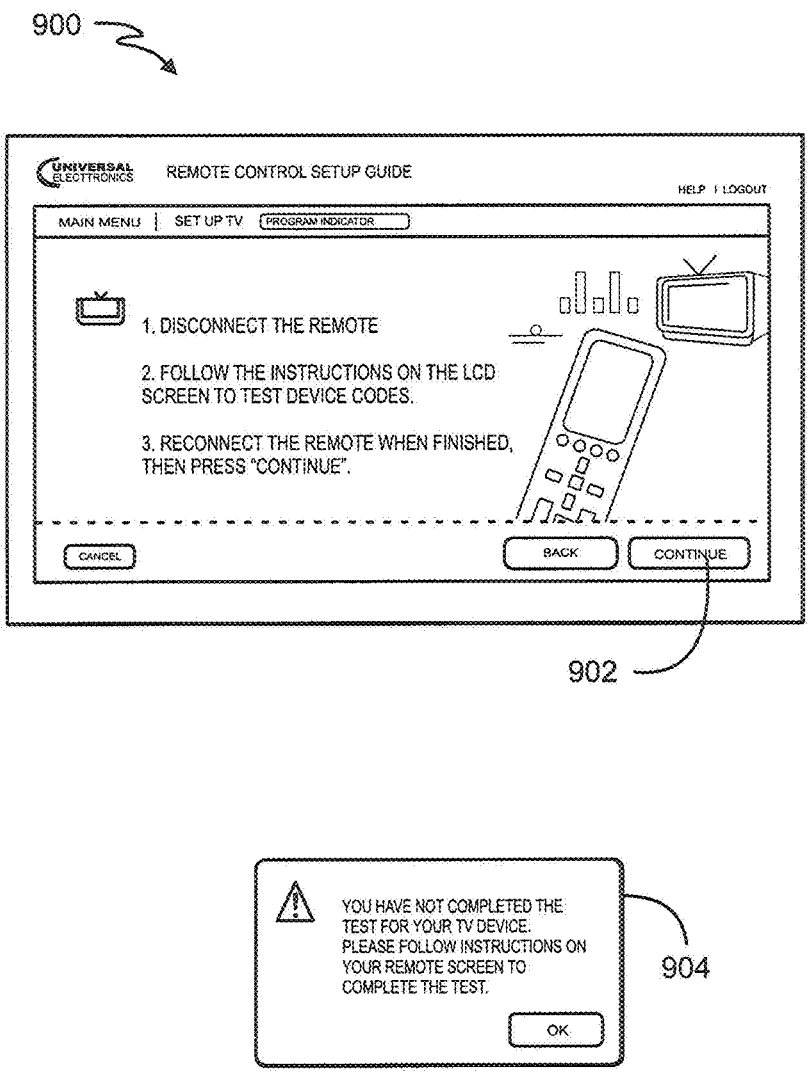
FIG. 9 illustrates portions of an exemplary user interface used in conjunction with the method illustrated in FIG. 8.

Turning now to FIG. 8, an exemplary method for adding an appliance to be controlled via the use of a PC based configuration application is illustrated in flowchart form. Initiation of this process 800 may occur automatically upon connection of a controlling device which experienced an unsuccessful on-board setup, i.e., reached step 420 in the flowchart of FIG. 4, or may be in response to user selection of the "Add device" option 712 from an exemplary main menu 700 of a configuration application. At step 802, brand and/or model information is received. This information may comprise data uploaded from controlling device 100, for example type and brand information selected by a user at steps 404 through 408 of FIG. 4, or may comprise information entered by a user directly into PC 200, or a combination thereof. At step 804 a database of command codes is searched for a match against the received type, brand, and model information. Such a database of codes may be located locally on PC 200 or may be located at a remote server 208, or a combination thereof. At step 808, if an unambiguous match is found, that is the brand and model data corresponding to one and only one command code set is an exact match for the brand and model information received at step 802, at step 822 the matched command code set is entered into the current configuration. In this regard, it will be appreciated that such a configuration entry may comprise a pointer or pointers to command code data determined to be already pre-programmed into memories 302, 304, 306 of controlling device 100; an entirely new command data set for download; or a combination thereof. If on the other hand, an unambiguous match cannot be made, for example the user supplied incomplete or no model information, the brand or model was not found in the database, etc., then at step 810 a set of sample codes may be prepared and loaded into controlling device 100. Determination of the contents of such a sample set of codes may be based, for example, on similar model numbers within the same brand, most likely code sets for a given brand, known most popular codes or brands for a particular installed base, etc. This determination may be further influenced by geographic or demographic information, such as language and region data entered into controlling device 100 during initial setup at step 402, localization parameters stored as part of the operating system configuration of PC 200, data solicited directly from the user as part of a registration process, etc. The sample codes used may comprise subsets of complete appliance command code sets, or may comprise complete command sets, as appropriate for a given embodiment—for example, depending on the amount of available free memory space in controlling device 100. Once the sample codes are loaded into controlling device 100, at step 812 the user may be prompted to disconnect the controlling device from the PC and test the codes, as illustrated by the exemplary display 900 of FIG. 9. After disconnection, the PC based configuration application may wait at step 814 for reconnection of the controlling device upon completion of testing. As illustrated by step 816, the application may include a time out which may cause the configuration application to exit this mode of operation if the controlling device has not been reconnected within some period of time, for example 30 minutes.

User testing of the downloaded sample codes on controlling device 100 may be conducted in a manner similar to that previously described in connection with steps 410 and 412 of FIG. 4. Upon reconnection of the controlling device and activation of exemplary "Continue" icon 902, at step 818 the status of controlling device 100 is checked to verify that testing of the sample code set was completed and a code selected. If not, at step 820 an error message is displayed, for example as illustrated by 904 of FIG. 9, and processing continues at step 812 where the user is once again prompted to disconnect the controlling device from the PC and test the sample codes. If an appropriate code set has been identified, processing proceeds at step 822 where the identified command code set is entered into the current configuration as previously described.

Figure 10:
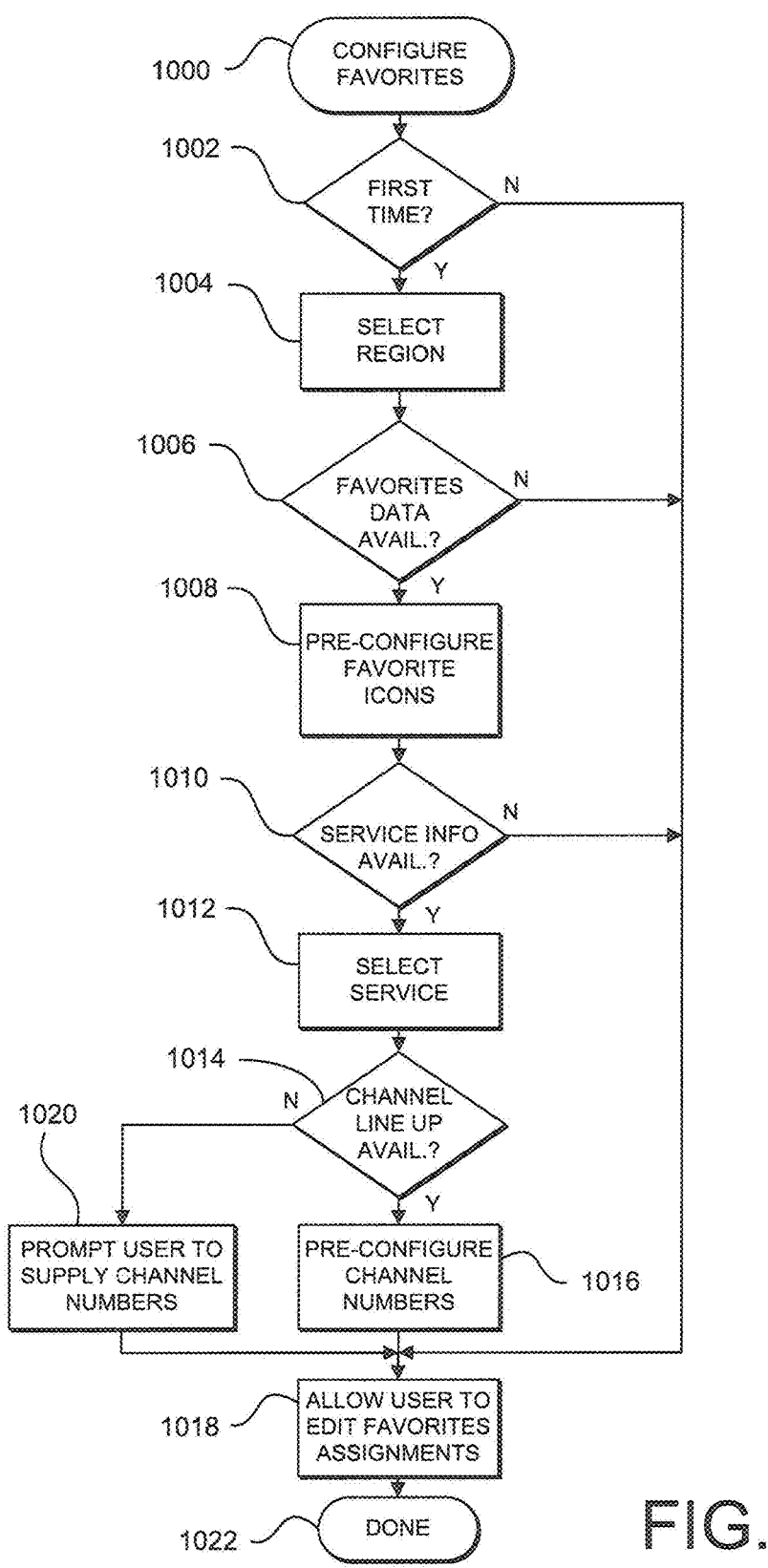
FIG. 10 illustrates in flow chart form an exemplary method for configuring favorites buttons or icons of the exemplary controlling device of FIG. 1.
Figure 11:
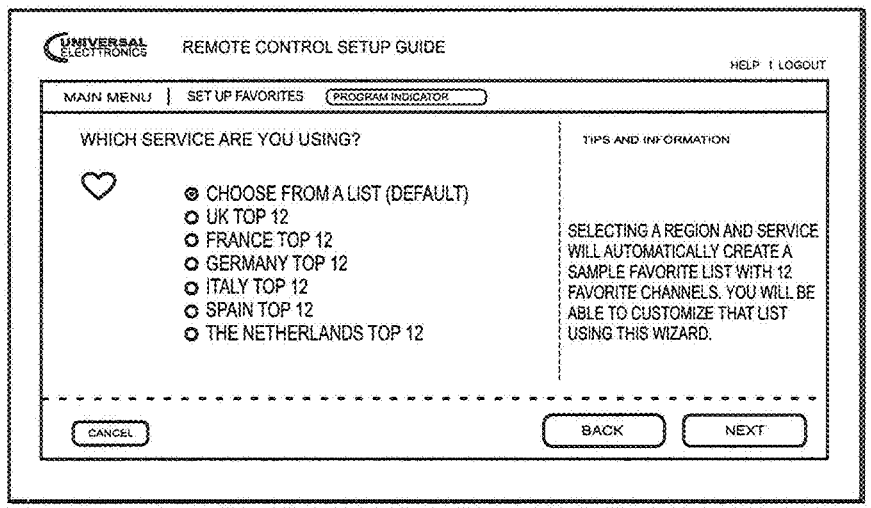
FIG. 11 illustrates portions of an exemplary user interface used in conjunction with the method illustrated in FIG. 10.
Figure 11:
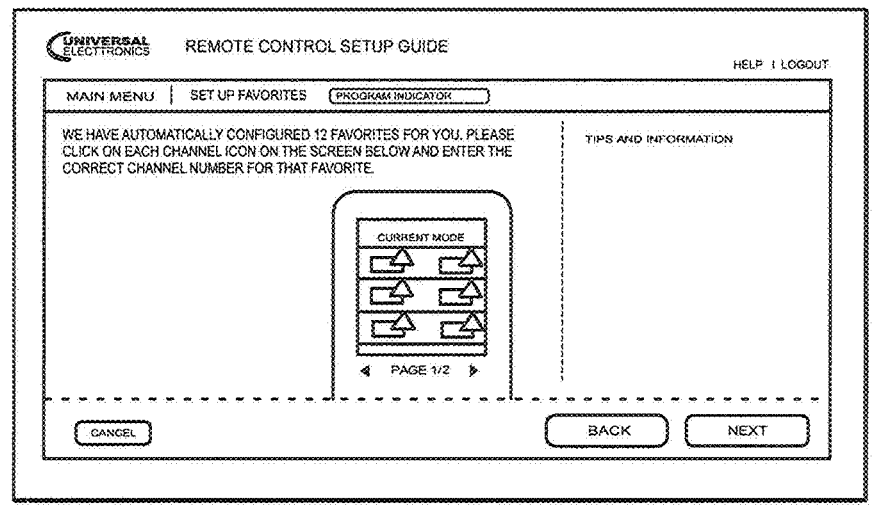

Turning now to FIG. 10, an exemplary method for configuring favorites buttons or icons of the controlling device is illustrated in flowchart form. In this regard, it will be understood that favorites keys are keys in the key matrix of the controlling device that have been designated by a user and/or provider for use in controlling favorite operations of a target device, e.g., to cause a device to tune to a favorite channel. Initiation of this process 1000 may be in response to user selection of a "Modify favorites" option 714 from an exemplary main menu 700 of a configuration application. In certain embodiments, initiation process 1000 may also occur automatically upon connection of a controlling device with an as-yet unconfigured favorites buttons or icons. Once initiated, at step 1002 it is determined if the favorites data of this particular controlling device configuration is not currently configured, such as may occur for example when a new controlling device is first connected, or when the configuration data has been reset, etc. If the favorites data is presently configured, at step 1018 the current configurations are displayed and the user may edit individual assignments, for example by selecting a line item 716 in a display of favorites data similar that illustrated at 706. If favorites data is not yet configured, at step 1004 the geographical region in which the controlling device is located may be determined. In various embodiments this region information may be derived from location and/or language data entered into controlling device 100 during initial setup at step 402, localization parameters stored as part of the operating system configuration of PC 200, obtained from the user as part of a registration process, obtained from GPS or the like hardware on the platform, directly solicited from the user as part of this step as illustrated for example by display 1100 of FIG. 11, or any combination thereof. At step 1006, it is then determined if favorites data, for example a listing of the most popular broadcast media, is available for the selected region either locally on PC 200 or from remote server 208. If not, manual configuration of favorites is required and processing continues at step 1018. If favorites data is available, the available favorites buttons or icons are automatically populated with this data, i.e. the names, and if available, logos of regional content providers. Next at step 1010, it may be determined if service information, i.e., channel line ups for cable providers, satellite providers, over the air, etc. is available for the selected region, either locally on PC 200 or from a remote server 208. If not, manual configuration of favorites channel number assignments and tuning device is required and processing continues at step 1018. Once again, such information may be derived from location and/or language data entered into controlling device 100 during initial setup at step 402, localization parameters stored as part of the operating system configuration of PC 200, obtained from the user as part of a registration process, directly solicited from the user as part of this step, etc., or any combination thereof. If not, manual configuration of favorites channel number assignments and tuning device is required and processing continues at step 1018. If service information is available, at step 1012 the service in use may be selected. This selection may be made automatically based on region, controlled appliance configuration, e.g., type of set top box to be controlled, user entered registration information, solicited directly by the user from a drop-down list of choices, or any combination thereof. Next, at step 1014 it is determined if channel line up information is available for the selected service provider, either locally on PC 200 or from a remote server 208. If not, manual configuration of favorites channel number assignments is required and at step 1020 the user is prompted to provide this information, for example as illustrated by display 1110 of FIG. 11. If channel line up information is however available, at step 1016 the channel numbers associated with the previously assigned favorite content providers are configured and the default configuration process is complete. As will be appreciated, in various embodiments the step of configuring channel numbers may comprise directly assigning appropriate command code values to particular favorites keys; or may comprise assigning identifying data such as numeric values, pointers, key codes, etc., which may be used by the operating program of controlling device 100 to retrieve appropriate command code values from command code data stored in some or all of the memories 302, 304, 306. Thereafter, at step 1018 the user is afforded an opportunity to review the default assignments and edit them if desired, after which favorites setup is complete at step 1022, and the updated configuration is ready for download into a connected controlling device 100 upon user command as previously described in connection with icon 710 illustrated in FIG. 7.

While various concepts have been described in detail, it will be appreciated by those skilled in the art that various modifications and alternatives to those concepts could be developed in light of the overall teachings of the disclosure. For example, in an alternate embodiment, geographic region information regarding the location of the system illustrated in FIGS. 1 and 2 may be automatically determined by server 208 based upon the IP address associated with PC 200, as is known in the art. Such information may be relayed back to a configuration application running on PC 200 for use in configuring controlling device 100 as previously described. Additionally, in some embodiments the selection by the operating program of controlling device 100 or the configuration application of PC 200 of a group of sample appliance command code sets to be tested may be conditioned by additional factors other than geographic region. For example, the selection by the user of a particular brand, model or command code set for one appliance type (e.g., their TV) may influence the selection or order of presentation of the sample command code sets offered during setup of a different appliance type (e.g., an AV receiver) based upon known consumer preferences for particular equipment combinations or pairings. Further, although presented in an illustrative embodiment as a standalone remote control, it will be understood that the functionality associated with controlling device 100 may be implemented as an optional or integral feature of another portable device, such as for example a PDA, cellular phone, etc.

Further, while described in the context of functional modules and illustrated using block diagram format, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of each module is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person skilled in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

All patents cited within this document are hereby incorporated by reference in their entirety.

What is claimed is:

1. A method for configuring a controlling device having a favorites input element that is pre-associated with a one of a plurality of media content to control operations of a target device which receives the plurality of media content from a media content provider, comprising:

receiving into the controlling device a media content lineup for the media content provider; and automatically configuring the controlling device by using the one of the plurality of media content that was associated with the favorites input element at a time prior to the receipt of the media content lineup and channel tuning information contained within the media content lineup to automatically assign one or more commands from a command code set stored in a memory of the controlling device to the favorites input element whereupon activation of the favorites input element causes the controlling device to transmit to the target device the one or more commands to thereby cause the target device to access the one of the plurality of media content.

2. The method as recited in claim 1, comprising using data indicative of a brand of the target device and data indicative of a type for the target device to identify the command code set for use in connection with the step of automatically configuring the controlling device.

3. The method as recited in claim 1, wherein the target device comprises a cable system set top box.

4. The method as recited in claim 1, wherein the target device comprises a satellite system set top box.

5. A method for configuring a controlling device having a favorites input element that is pre-associated with a one of a plurality of media content to control operations of a target device which receives the plurality of media content from a media content provider, comprising:

receiving into the controlling device a media content lineup for the media content provider; and in response to an activation of the favorites input element of the controlling device, causing the controlling device to automatically use the one of the plurality of media content that was associated with the favorites input element at a time prior to the receipt of the media content lineup with the favorites input element and channel tuning information contained within the media content lineup to select one or more commands from a command code set stored in a memory of the controlling device and to transmit to the target device the one or more selected commands to thereby cause the target device to access the one of the plurality of media content.

6. The method as recited in claim 5, wherein the target device comprises a cable system set top box.

7. The method as recited in claim 5, wherein the target device comprises a satellite system set top box.

* * * * *

UNITED STATES PATENT AND TRADEMARK OFFICE
CERTIFICATE OF CORRECTION

PATENT NO. : 10,235,873 B2  
APPLICATION NO. : 12/490978  
DATED : March 19, 2019  
INVENTOR(S) : Brandt J. Thompson et al.

Page 1 of 1

It is certified that error appears in the above-identified patent and that said Letters Patent is hereby corrected as shown below:

On the Title Page

On Page 2  
Related U.S. Application Data Item (60), Line 4:  
60/344,774 should read 60/334,774

Signed and Sealed this  
Twenty-sixth Day of October, 2021

Drew Hirshfeld  
*Performing the Functions and Duties of the*  
*Under Secretary of Commerce for Intellectual Property and*  
*Director of the United States Patent and Trademark Office*